United States Patent
Miyata et al.

(10) Patent No.: US 9,099,700 B2
(45) Date of Patent: Aug. 4, 2015

(54) FUEL CELL SYSTEM AND WARMING UP COMPLETION DETERMINING METHOD FOR THE SAME

(75) Inventors: Koichiro Miyata, Wako (JP); Chihiro Wake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1301 days.

(21) Appl. No.: 12/565,691

(22) Filed: Sep. 23, 2009

(65) Prior Publication Data
US 2010/0112389 A1 May 6, 2010

(30) Foreign Application Priority Data
Oct. 31, 2008 (JP) .................................. 2008-281275

(51) Int. Cl.
*H01M 8/04* (2006.01)
*H01M 8/10* (2006.01)

(52) U.S. Cl.
CPC ........ *H01M 8/0432* (2013.01); *H01M 8/04253* (2013.01); *H01M 8/04723* (2013.01); *H01M 2008/1095* (2013.01); *Y02E 60/50* (2013.01)

(58) Field of Classification Search
CPC .................................................... H01M 8/0432
USPC ................................................ 429/429, 433
See application file for complete search history.

(56) References Cited

U.S. PATENT DOCUMENTS

| | | | | |
|---|---|---|---|---|
| 7,858,251 B2 * | 12/2010 | Wake et al. | .................... | 429/429 |
| 2005/0053810 A1 * | 3/2005 | Kato et al. | ...................... | 429/13 |
| 2005/0181246 A1 * | 8/2005 | Nakaji | ............................ | 429/13 |
| 2007/0026278 A1 * | 2/2007 | Wake et al. | .................... | 429/22 |

FOREIGN PATENT DOCUMENTS

| | | | | |
|---|---|---|---|---|
| JP | 2005-085578 | | 3/2005 | |
| JP | 2007-141812 | | 6/2007 | |
| JP | 2007-188825 | | 7/2007 | |
| JP | 2007188825 | * | 7/2007 | .............. H01M 8/04 |
| JP | 2008-218165 | | 9/2008 | |

OTHER PUBLICATIONS

Japanese Office Action for corresponding JP Application No. 2008-281275, Dec. 4, 2012.

* cited by examiner

*Primary Examiner* — Tony G Soohoo
*Assistant Examiner* — Peter Keyworth
(74) *Attorney, Agent, or Firm* — Mori & Ward, LLP

(57) ABSTRACT

A fuel cell system includes a fuel cell stack, a warming up status detector, a warming up completion threshold setter, an informing device, an estimator, and a threshold changer. The warming up status detector is configured to detect a warming up status of the fuel cell stack. The informing device is configured to inform of completion of warming up when a value corresponding to a warming up status detected by the warming up status detector is equal to or higher than a threshold value set by the warming up completion threshold setter. The estimator is configured to estimate whether generated water is frozen in the fuel cell stack. The threshold changer is configured to change the threshold value set by the warming up completion threshold setter in accordance with a freezing state of the generated water in the fuel cell stack estimated by the estimator.

16 Claims, 6 Drawing Sheets

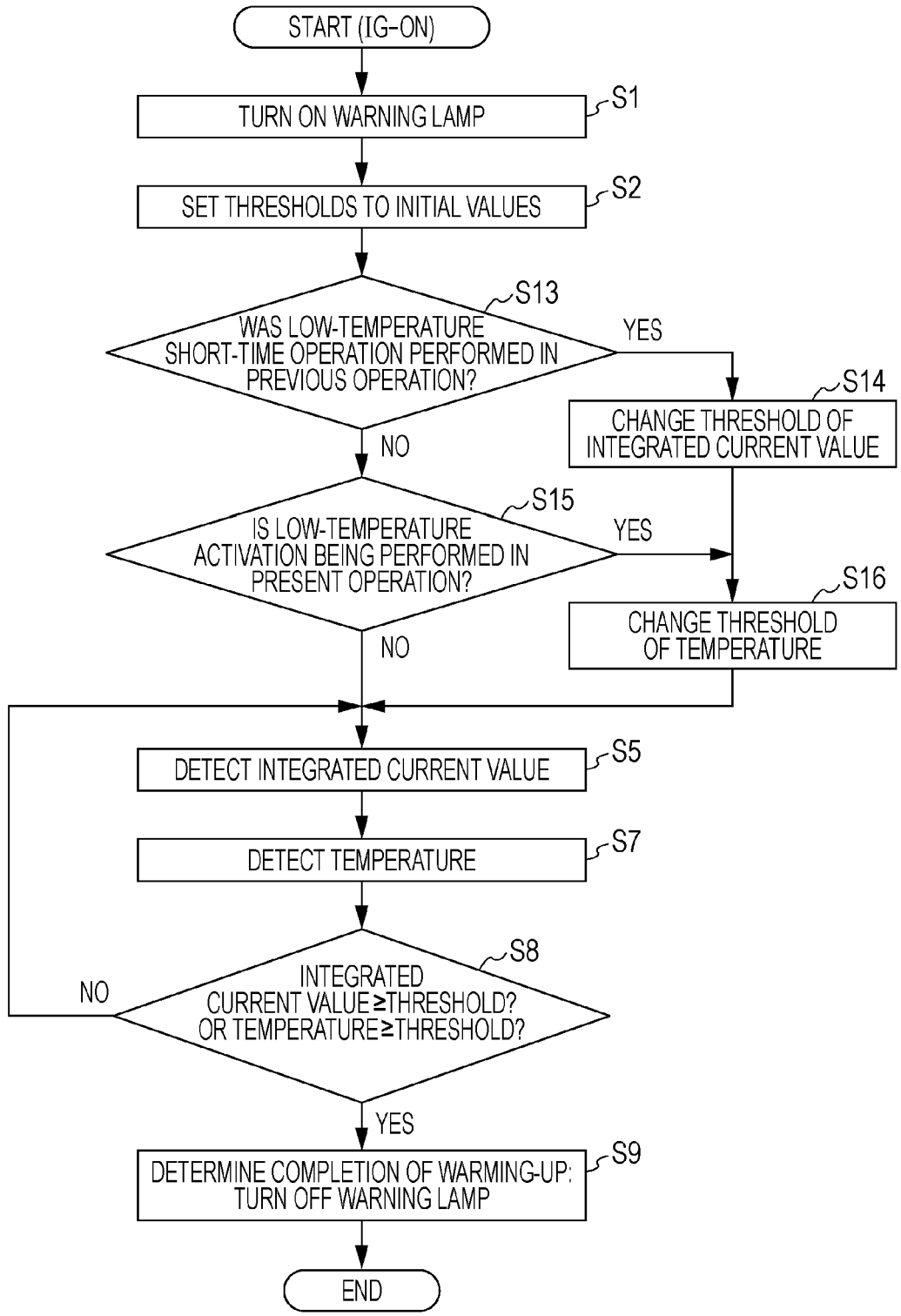

FUEL CELL SYSTEM AND WARMING UP COMPLETION DETERMINING METHOD FOR THE SAME

CROSS-REFERENCE TO RELATED APPLICATIONS

The present application claims priority under 35 U.S.C. §119 to Japanese Patent Application No. 2008-281275, filed Oct. 31, 2008. The contents of this application are incorporated herein by reference in their entirety.

BACKGROUND OF THE INVENTION

1. Field of the Invention

The present invention relates to a fuel cell system and a warming up completion determining method for the fuel cell system.

2. Discussion of the Background

In the field of fuel cells, a fuel cell stack is known. The fuel cell stack includes a plurality of unit fuel cells (hereinafter referred to as "unit cells") that are stacked on top of one another. Each of the unit cells is plate shaped and includes a membrane electrode assembly (MEA) that is formed by sandwiching a solid polymer electrolyte membrane between an anode and a cathode and a pair of separators placed on both sides of the MEA. In each unit cell of the fuel cell stack, hydrogen gas serving as fuel gas (anode gas) is supplied to a fuel gas channel between the anode and the separator on the anode side, and air serving as oxidant gas (cathode gas) is supplied to an oxidant gas channel between the cathode and the separator on the cathode side. Accordingly, hydrogen ions produced by a catalytic reaction in the anode pass through the solid polymer electrolyte membrane, move to the cathode, and cause an electrochemical reaction with oxygen in the air in the cathode, so that electric power is generated. In accordance with the generation of electric power, water is generated in the oxidant gas channel (hereinafter referred to as "generated water").

Some fuel cell stacks of this type are provided with an informing unit configured to inform a driver of whether the power generation performance of the fuel cell stack has reached a predetermined range after warming up has been performed after activation of the fuel cell stack has started in order to realize stable generation of electric power. As such a configuration, the following configuration is known. That is, the time from when a system starting instruction is received until when the informing unit is operated is changed in accordance with an elapsed time from when a system stopping instruction was previously received until when the system starting instruction is received (e.g., see Japanese Unexamined Patent Application Publication No. 2008-218165).

In the above-described fuel cell stack, the power generation performance thereof may not be ensured even if the temperature in the fuel cell system is not low during activation. Specifically, in the case where the previous activation was performed under a low-temperature environment and an activation time was short (hereinafter referred to as "low-temperature short-time operation") and where the temperature in the fuel cell system is not low at the next activation, generated water generated during the previous activation may remain in a frozen state in the fuel cell stack. That is, generated water freezes if the fuel cell stack is activated under a low-temperature environment. The freezing is overcome by continuing a warming up operation, but is not overcome if the warming up operation is performed for a short time, and the generated water remains as ice in the fuel cell stack. In this case, the ice covers the individual cells, reducing effective areas for generating electric power of the individual cells. This causes a problem that the power generation performance of the fuel cell stack is not ensured until the freezing is overcome. The temperature for ensuring the power generation performance of the fuel cell stack is typically about 70 to 80° C.

In the above-mentioned example of the related art, a decrease in concentration of hydrogen gas is dealt with as a problem, but freezing of generated water due to a low-temperature short-time operation is not considered. That is, in the configuration according to the related art, the informing unit is operated on the basis of the time from the previous system stopping instruction to a system starting instruction regardless of an activation environment of the fuel cell stack. For this reason, the informing unit may be operated before freezing of generated water is overcome in the case of low-temperature activation or activation after a low-temperature short-time operation. As a result, a desired power generation performance is not obtained, or current for generating electric power or the amount of supplied air is increased in order to obtain an output equivalent to that in normal-temperature activation, which causes a driver to feel uncomfortable.

SUMMARY OF THE INVENTION

According to one aspect of the present invention, a fuel cell system includes a fuel cell stack, a warming up status detector, a warming up completion threshold setter, an informing device, an estimator, and a threshold changer. The fuel cell stack is configured to generate electric power using reactive gas supplied to the fuel cell stack. The warming up status detector is configured to detect a warming up status of the fuel cell stack. The warming up completion threshold setter is configured to set a threshold value in order to determine completion of warming up of the fuel cell stack. The informing device is configured to inform of the completion of warming up when a value corresponding to the warming up status detected by the warming up status detector is equal to or higher than the threshold value set by the warming up completion threshold setter. The estimator is configured to estimate whether generated water is frozen in the fuel cell stack. The threshold changer is configured to change the threshold value set by the warming up completion threshold setter in accordance with a freezing state of the generated water in the fuel cell stack estimated by the estimator.

According to another aspect of the present invention, a warming up completion determining method for a fuel cell system includes supplying reactive gas to a fuel cell stack to generate electric power. A warming up status of the fuel cell stack is detected. A threshold value is set in order to determine completion of warming up of the fuel cell stack. The completion of warming up is informed when a value corresponding to the warming up status is equal to or higher than the threshold value. It is estimated whether generated water is frozen in the fuel cell stack. The threshold value is changed in accordance with a freezing state of the generated water in the fuel cell stack estimated in the estimating process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a flowchart illustrating a warming up completion determining method according to a second embodiment of the present invention.

DESCRIPTION OF THE EMBODIMENTS

Figure 1:
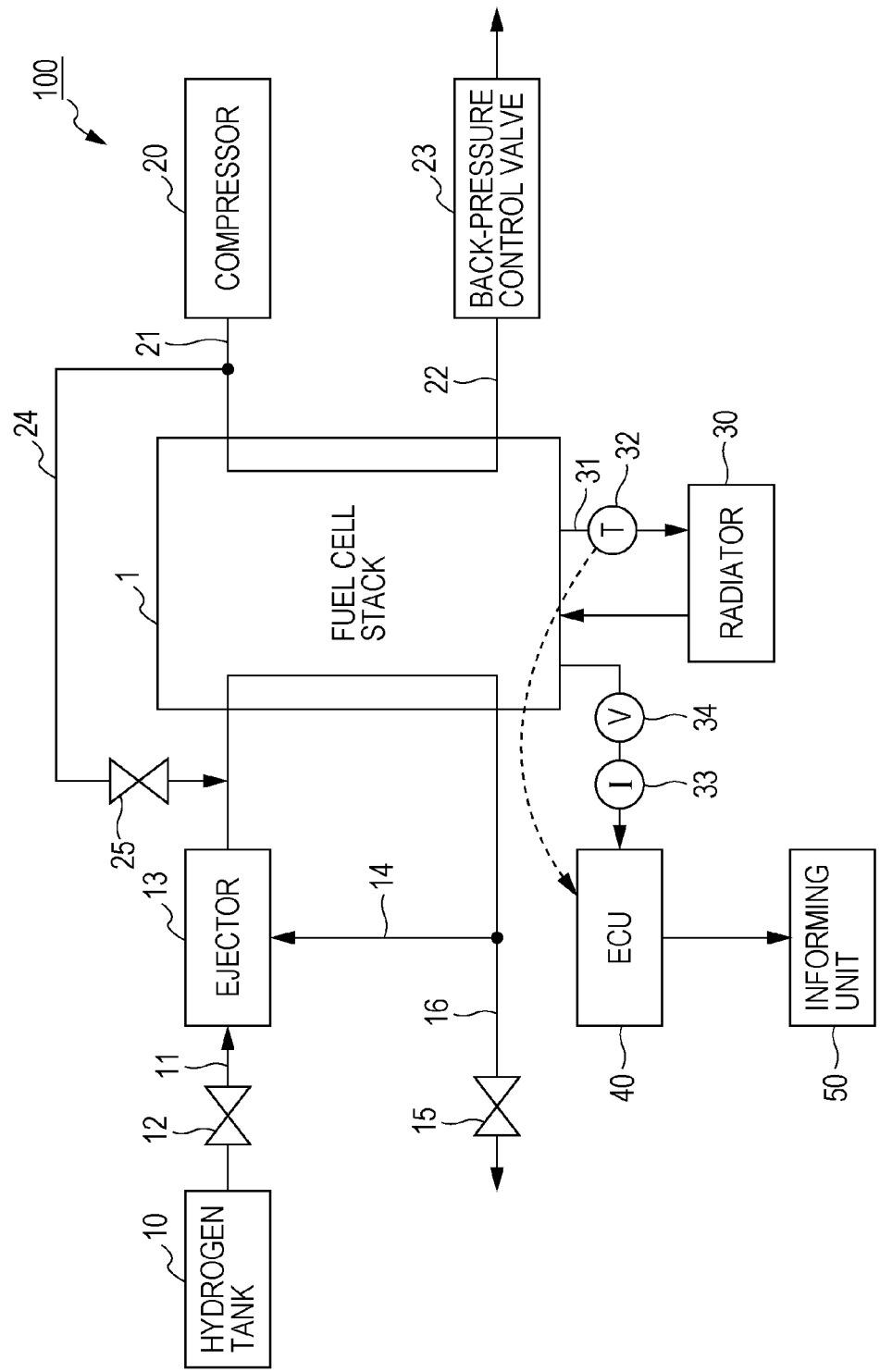
FIG. 1 illustrates an entire configuration of a fuel cell system according to an embodiment of the present invention.

Embodiments will now be described with reference to the accompanying drawings, wherein like reference numerals designate corresponding or identical elements throughout the various drawings.

First Embodiment

Fuel Cell System

FIG. 1 illustrates an entire configuration of a fuel cell system 100 according to an embodiment of the present invention. As illustrated in FIG. 1, the fuel cell system 100 is mounted in a fuel cell vehicle (not illustrated) and includes a fuel cell stack 1.

The fuel cell stack 1 generates electric power through an electrochemical reaction between fuel gas (anode gas) such as hydrogen gas and oxidant gas (cathode gas) such as air, and includes a plurality of stacked cells. Each of the cells includes a solid polymer electrolyte membrane (hereinafter referred to as "electrolyte membrane") including a catalyst such as a solid polymer ion exchange membrane. The electrolyte membrane is sandwiched between an anode and a cathode.

The fuel cell system 100 also includes a hydrogen tank 10 that stores hydrogen gas serving as anode gas and that supplies the hydrogen gas to the fuel cell stack 1. The hydrogen tank 10 is connected to an inlet side of the fuel cell stack 1 via an anode gas supplying channel 11. A pressure reducing valve 12 that reduces a pressure of anode gas to a predetermined pressure and an ejector 13 that allows anode off-gas to rejoin to the anode gas supplying channel 11 are provided in the anode gas supplying channel 11 between the hydrogen tank 10 and the fuel cell stack 1.

An anode off-gas circulating channel 14 is connected to an anode gas discharging side (outlet side) of the fuel cell stack 1. Unreacted anode gas that has not been consumed in the fuel cell stack 1 passes through the anode off-gas circulating channel 14, is sucked into the ejector 13, and is supplied again to the anode gas supplying channel 11.

An anode off-gas discharging channel 16 provided with a hydrogen discharging valve 15 branches from the anode off-gas circulating channel 14. The hydrogen discharging valve 15 opens as necessary, e.g., when the concentration of impurities (moisture, nitrogen, etc.) in the anode gas circulating in the fuel cell stack 1 becomes high, so as to discharge anode off-gas.

The fuel cell system 100 also includes a compressor 20 that applies a predetermined pressure to air serving as cathode gas. A cathode gas supplying channel 21 for supplying air from the compressor 20 to the fuel cell stack 1 is connected to the compressor 20. A cathode off-gas discharging channel 22 for discharging the air that has passed through the cathode of the fuel cell stack 1 to the outside is connected to a cathode gas discharging side of the fuel cell stack 1. A back-pressure control valve 23 for adjusting an inner pressure of the cathode is provided in the cathode off-gas discharging channel 22.

The fuel cell system 100 further includes an air introducing channel 24 that branches from the cathode gas supplying channel 21 and that joins the anode gas supplying channel 11 on a downstream side of the ejector 13. An air introducing valve 25 is provided in the air introducing channel 24. By opening the air introducing valve 25, pressurized air sent from the compressor 20 can be directly introduced to the anode gas supplying channel 11 on the anode side.

The fuel cell stack 1 is provided with a cooling water channel 31 that is connected to a radiator 30 of a vehicle. The cooling water channel 31 is provided with a temperature sensor 32 for measuring a temperature of water in the channel, and a measurement result of the temperature sensor 32 is input as temperature information to an ECU (Engine Control Unit) 40.

Also, a current sensor 33 and a voltage sensor 34 for detecting currents and voltages of the fuel cell stack 1 are connected to the fuel cell stack 1. Measurement results of the current sensor 33 and the voltage sensor 34 are output as current information and voltage information to the ECU 40.

An informing unit 50 including a lamp or the like is connected to the ECU 40. The informing unit 50 informs a driver that warming up of the fuel cell stack 1 has been completed, that is, the fuel cell stack 1 has become ready to generate electric power. The informing unit 50 operates on the basis of an informing signal from the ECU 40, whereby the driver can determine whether warming up has been completed.

ECU

Figure 2:
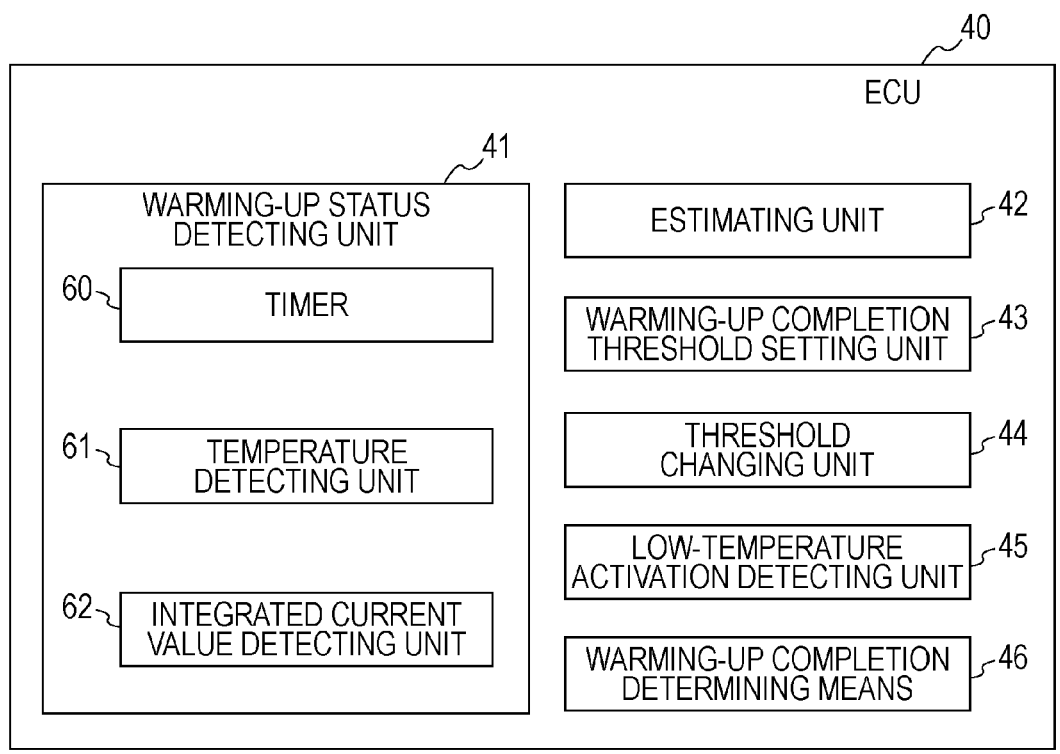
FIG. 2 is a block diagram of an ECU according to an embodiment of the present invention.

FIG. 2 is a block diagram of the ECU 40. As illustrated in FIG. 1, the ECU 40 for controlling the entire fuel cell system 100 is connected to the fuel cell stack 1 via the current sensor 33 and the voltage sensor 34.

The ECU 40 mainly includes a warming up status detecting unit 41, an estimating unit 42, a warming up completion threshold setting unit 43, a threshold changing unit 44, a low-temperature activation detecting unit 45, and a warming up completion determining unit 46. Although not illustrated in the figure, the ECU 40 also includes a memory unit or the like for storing currents, voltages, temperatures, and activation times of the fuel cell stack 1.

The warming up status detecting unit 41 monitors a warming up status of the fuel cell stack 1, that is, a temperature, an integrated current value, an activation time, and the like of the fuel cell stack 1, and includes a timer 60, a temperature detecting unit 61, and an integrated current value detecting unit 62.

The timer 60 measures an activation time of the fuel cell system 100, and a measurement result is recorded in the memory unit. The activation time of the fuel cell system 100 is defined as the time from ignition ON (hereinafter referred to as "IG-ON") to ignition OFF (hereinafter referred to as "IG-OFF") of the vehicle.

The temperature detecting unit 61 receives temperature information from the above-described temperature sensor 32 and detects a temperature in the fuel cell stack 1. A detection result is recorded in the memory unit. The temperature in the fuel cell stack 1 in this embodiment is defined as an average temperature in the fuel cell stack 1.

The integrated current value detecting unit 62 calculates an integrated current value (integrated value of current) from IG-ON in the fuel cell stack 1 on the basis of a current signal from the above-described current sensor 33 and a measurement signal from the timer 60. In this case, the integrated current value is equivalent to the amount of heat generated by the fuel cell stack 1, and is used to calculate the amount of heat necessary to melt generated water frozen in the fuel cell stack 1.

The estimating unit 42 estimates whether a low-temperature short-time operation was performed in the previous operation in the fuel cell system 100. Specifically, the estimating unit 42 has estimation thresholds based on the temperature and activation time of the fuel cell stack 1 in the previous operation. If the temperature and activation time of the fuel cell stack 1 in the previous operation read from the memory unit are equal to or lower than the estimation thresholds, the estimating unit 42 estimates that ice exists in the fuel cell stack 1. That is, if a low-temperature short-time operation was performed in the previous operation, the estimating unit 42 estimates that generated water generated in the previous operation has frozen in the fuel cell stack 1 and still exists as ice.

The warming up completion threshold setting unit 43 sets thresholds of a temperature and an integrated current value enabling the fuel cell stack 1 to generate electric power (first thresholds: warming up completion thresholds). The warming up completion thresholds in activation under a normal-temperature environment are set as initial values of the fuel cell stack 1.

The low-temperature activation detecting unit 45 detects whether activation under a low-temperature environment is being performed in the present operation in the fuel cell stack 1 on the basis of a detection result obtained by the temperature detecting unit 61. Specifically, the low-temperature activation detecting unit 45 has a temperature threshold for determining low-temperature activation of the fuel cell system 100 (low-temperature activation determination threshold). If the temperature during the present operation read from the memory unit is equal to or lower than the low-temperature activation determination threshold, the low-temperature activation detecting unit 45 determines that low-temperature activation is being performed in the fuel cell system 100.

The threshold changing unit 44 changes the warming up completion thresholds set by the warming up completion threshold setting unit 43 on the basis of an estimation result obtained by the estimating unit 42. Specifically, if the estimating unit 42 estimates that a low-temperature short-time operation was performed in the previous operation and that ice exists in the fuel cell stack 1 in the present operation, or if the low-temperature activation detecting unit 45 determines that low-temperature activation is being performed in the present operation, the threshold changing unit 44 sets the warming up completion thresholds of a temperature and an integrated current value to high values.

The warming up completion thresholds (temperature and integrated current value) changed by the threshold changing unit 44 are preferably set to values necessary for melting the ice that exists in the fuel cell stack 1 due to a low-temperature short-time operation. This is because, when ice exists in the fuel cell stack 1 in the case where a low-temperature short-time operation was not performed in the previous operation, the amount of ice is small because the ice is a result of freezing of water generated just after start of activation. Therefore, the ice generated in low-temperature activation can be reliably melted when the temperature and integrated current value in the fuel cell stack 1 are equal to or higher than the warming up completion thresholds for activation after a low-temperature short-time operation.

The warming up completion determining unit 46 determines whether warming up of the fuel cell stack 1 has been completed. Specifically, the warming up completion determining unit 46 determines that warming up of the fuel cell stack 1 has been completed when a detection result obtained by the warming up status detecting unit 41 is equal to or higher than the thresholds set by the warming up completion threshold setting unit 43, and outputs the determination result to the informing unit 50.

Warming up Completion Determining Method for Fuel Cell System

Figure 3:
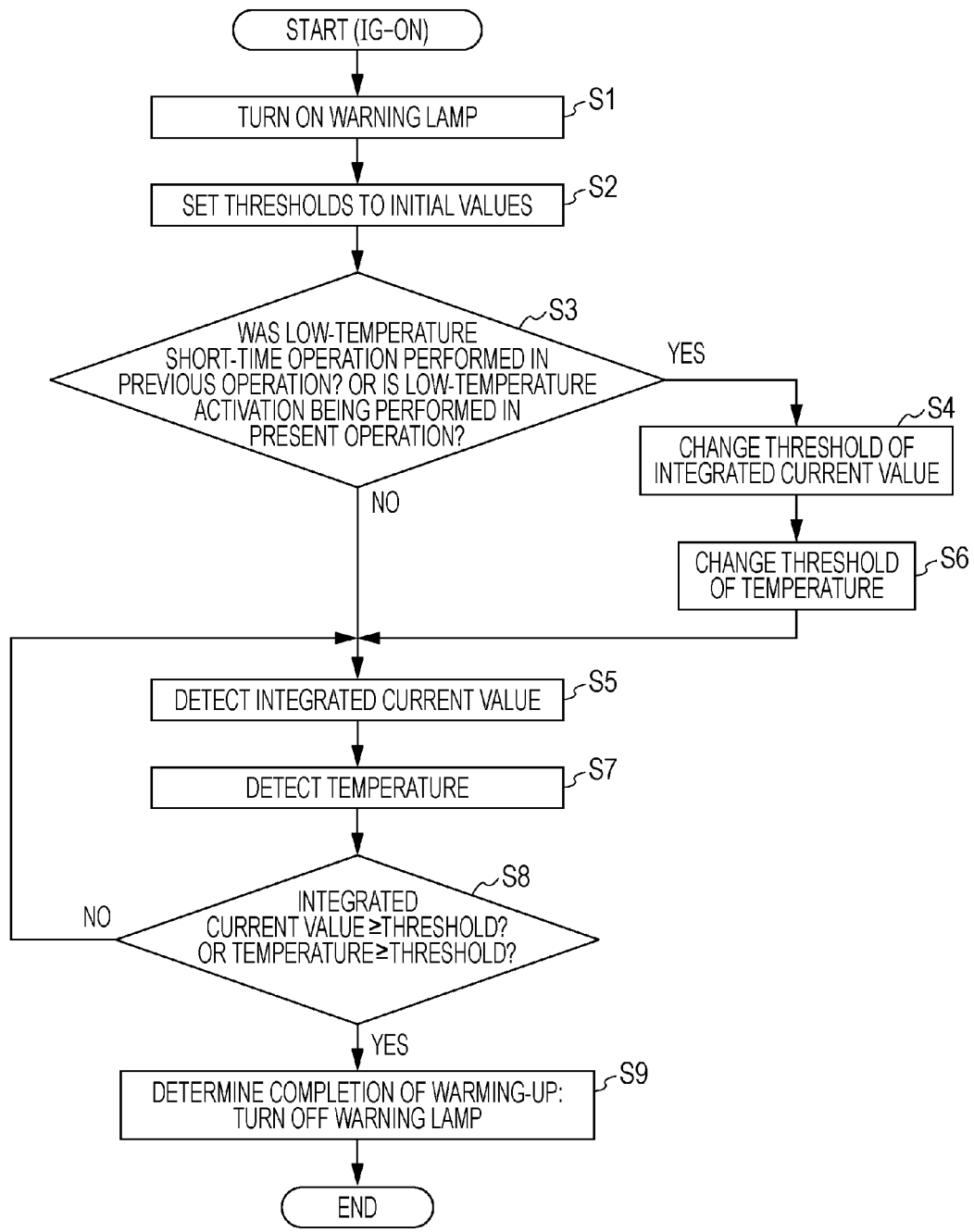
FIG. 3 is a flowchart illustrating a warming up completion determining method according to a first embodiment of the present invention.

Hereinafter, a warming up completion determining method according to this embodiment is described. FIG. 3 is a flowchart illustrating the warming up completion determining method.

As illustrated in FIG. 3, upon IG-ON of the vehicle, a warning lamp of the informing unit 50, indicating that warming up has not yet been completed, is turned on in step S1, and the process proceeds to step S2.

In step S2, the warming up completion threshold setting unit 43 sets the warming up completion thresholds to values for normal-temperature activation (initial values).

In step S3, it is determined whether a low-temperature short-time operation was performed in the previous operation. Specifically, the estimating unit 42 determines whether the temperature and activation time of the fuel cell stack 1 in the previous operation are equal to or lower than estimation thresholds. Also, in step S3, it is determined whether low-temperature activation is being performed in the present operation. Specifically, the low-temperature activation detecting unit 45 detects whether the temperature in the fuel cell stack 1 in the present operation is equal to or lower than the low-temperature activation determination threshold.

If the determination result in step S3 is "YES" (if the temperature and activation time of the fuel cell stack 1 in the previous operation are equal to or lower than the estimation thresholds, or if the temperature in the fuel cell stack 1 in the present operation is equal to or lower than the low-temperature activation determination threshold), the process proceeds to step S4.

That is, if the temperature and activation time of the fuel cell stack 1 in the previous operation are equal to or lower than the estimation thresholds, the following estimation can be made. That is, since a low-temperature short-time operation was performed in the previous operation, generated water in the previous operation remains in a frozen state in the fuel cell stack 1, so that ice exists in the fuel cell stack 1. If the temperature in the fuel cell stack 1 in the present operation is equal to or lower than the low-temperature activation determination threshold, generated water generated just after start of activation of the fuel cell stack 1 freezes, and thus a small amount of ice exists in the fuel cell stack 1. Also, an activity level of the catalyst (electrolyte membrane) is low.

On the other hand, if the determination result in step S3 is "NO" (if the temperature and activation time of the fuel cell stack 1 in the previous operation exceed the estimation thresholds, or if the temperature in the fuel cell stack 1 in the present operation exceeds the low-temperature activation determination threshold), the process proceeds to step S5. That is, if the determination result in step S3 is "NO", it is determined that a low-temperature short-time operation was not performed in the previous operation and that low-temperature activation is not being performed in the present operation, and the process proceeds to step S5 without the initial values of the warming up completion thresholds set by the warming up completion threshold setting unit 43 in step S2 being changed.

Figure 4:
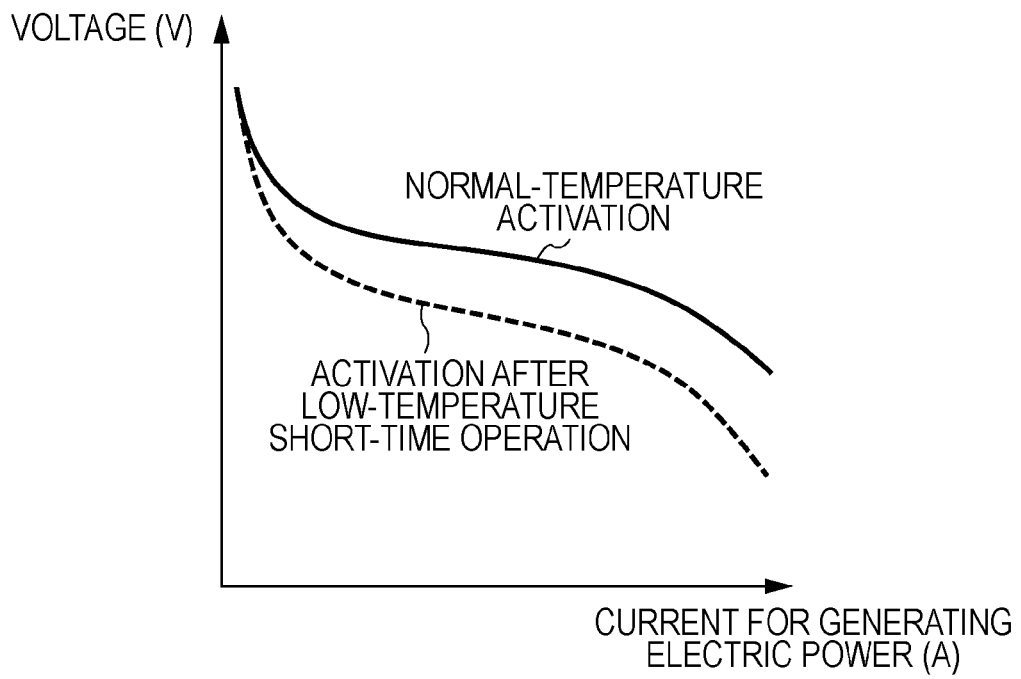
FIG. 4 is a graph showing a relationship between current for generating electric power (A) and voltage (V) (I-V characteristic) of a fuel cell stack.
Figure 5:
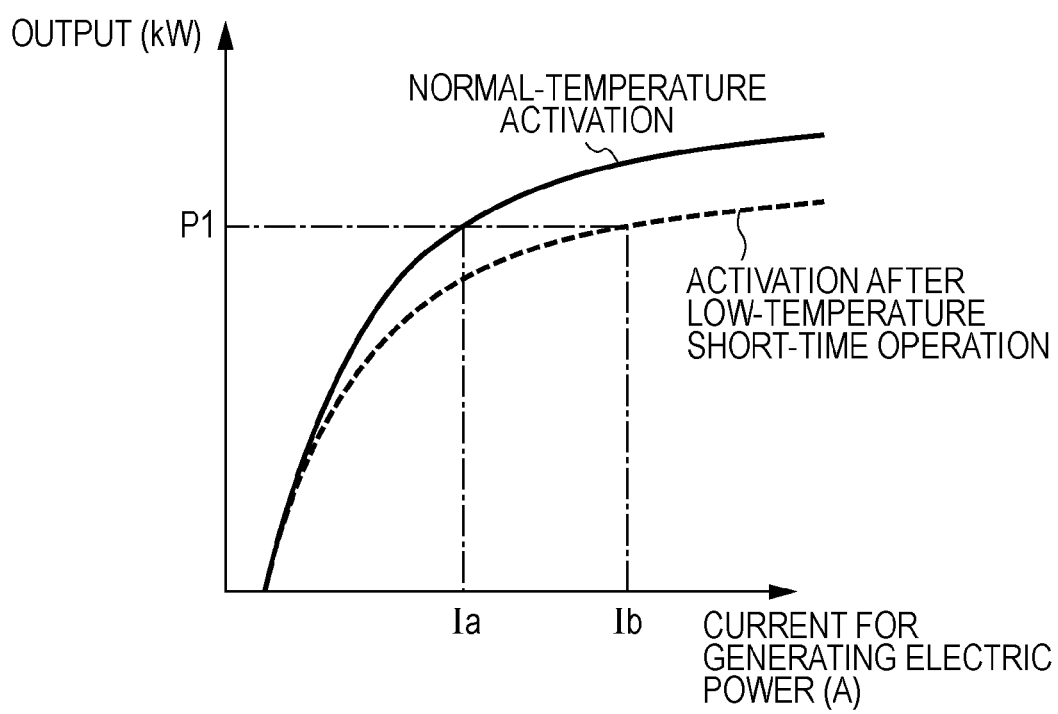
FIG. 5 is a graph showing a relationship between current for generating electric power (A) and output (kW) (I-P characteristic) of the fuel cell stack.

FIG. 4 is a graph showing a relationship between current for generating electric power (A) and voltage (V) (I-V characteristic) of the fuel cell stack 1, whereas FIG. 5 is a graph showing a relationship between current for generating electric power (A) and output power (kW) (I-P characteristic). In FIGS. 4 and 5, a solid line indicates normal-temperature activation (normal-temperature activation also in the previous operation), whereas a broken line indicates activation after a low-temperature short-time operation.

As illustrated in FIG. 4, in activation after a low-temperature short-time operation, the I-V characteristic is low just after start of activation. In the activation after a low-temperature short-time operation, the I-V characteristic improves as warming up progresses after the activation has started, but the I-V characteristic is lower than that in normal-temperature activation at any temperature during warming up. The reason for this is as follows. If a low-temperature short-time operation was performed in the previous operation, generated water generated during the previous operation froze in the fuel cell stack 1, and the frozen water covers the individual cells, so that the effective areas for generating electric power of the individual cells decrease.

As illustrated in FIG. 5, in activation after a low-temperature short-time operation, a maximum output is lower than that in activation after a normal-temperature operation when the I-V characteristic is low. Specifically, the amount of current necessary for generating output power of P1 (kW) is Ia (A) in activation after a normal-temperature operation, whereas that in activation after a low-temperature short-time operation is larger at Ib (A). Therefore, the amount of air supplied to generate the same output is larger in activation after a low-temperature short-time operation, so that NV (noise-and-vibration) performance degrades.

As described above, a behavior different from that in activation after a normal-temperature operation occurs in activation after a low-temperature short-time operation.

Figure 6:
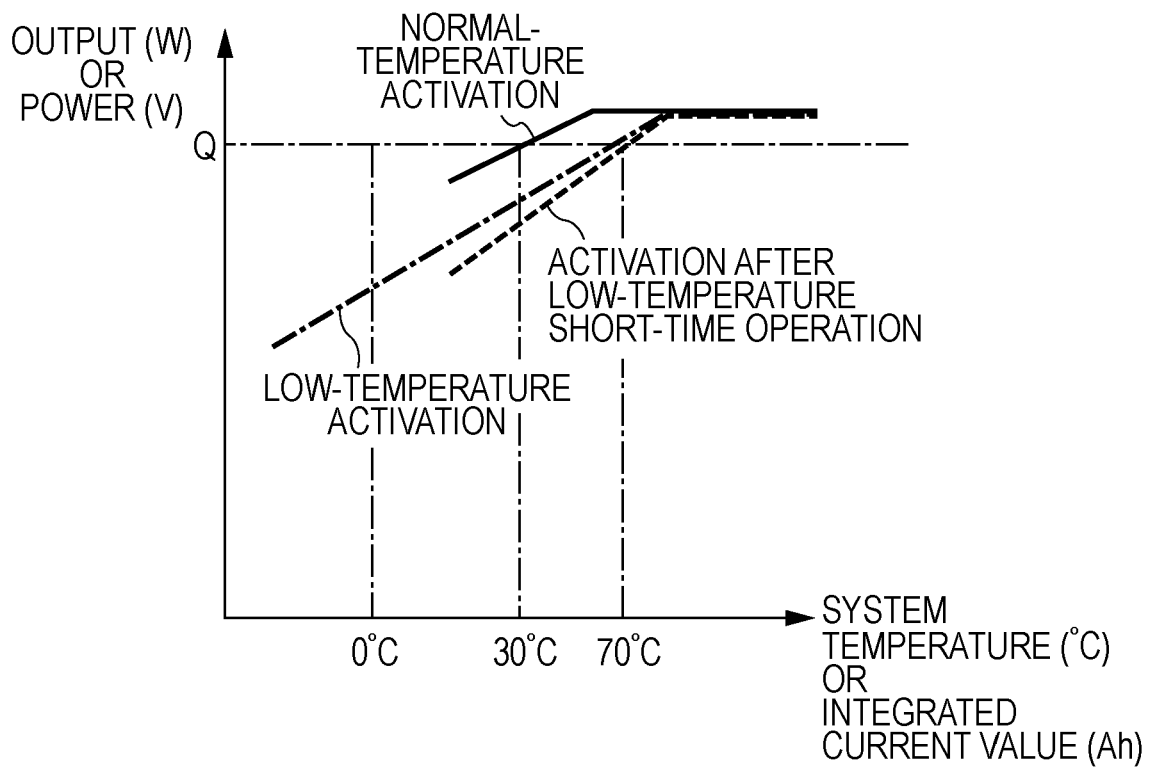
FIG. 6 is a graph showing a recovery behavior of output (or voltage) for a predetermined current value.

FIG. 6 is a graph showing a recovery behavior of output (or voltage) for a predetermined current value. In FIG. 6, a solid line indicates normal-temperature activation, a broken line indicates activation after a low-temperature short-time operation, and a chain line indicates low-temperature activation. A chain line Q in FIG. 6 indicates the voltage with which completion of warming up of the fuel cell stack 1 can be determined, that is, the voltage value (output) with which power generation performance and stability in generating electric power can be ensured.

As illustrated in FIG. 6, in activation after a low-temperature short-time operation and in low-temperature activation, it is possible that ice in the fuel cell stack 1 remains without being completely melted, and thus the temperature and integrated current value for obtaining the voltage value Q for completion of warming up are higher than those in normal-temperature activation. Therefore, if determination of warming up completion is made on the basis of the same warming up completion thresholds as those in normal-temperature activation in activation after a low-temperature short-time operation or in low-temperature activation, a maximum output is not obtained, or the amount of current for generating electric power or the amount of supplied air becomes large when an output equivalent to that in normal-temperature activation is to be obtained. This causes a driver to feel uncomfortable.

In this embodiment, if the determination result in step S3 is "YES", the threshold changing unit 44 changes the warming up completion threshold of the integrated current value in step S4. Specifically, the threshold changing unit 44 changes the warming up completion threshold to a value higher than the initial integrated current value set by the warming up completion threshold setting unit 43, that is, to an integrated current value enabling the acquisition of a heat amount necessary to melt the ice generated in the low-temperature short-time operation. Subsequently, the process proceeds to step S6. In step S6, the threshold changing unit 44 changes the warming up completion threshold of the temperature in the fuel cell stack 1. Specifically, the threshold changing unit 44 changes the warming up completion threshold to a value higher than the initial temperature value set by the warming up completion threshold setting unit 43 (e.g., about 60 to 70° C.). Subsequently, the process proceeds to step S5.

In step S5, the integrated current value detecting unit 62 detects an integrated current value of the fuel cell stack 1. Specifically, the integrated current value detecting unit 62 calculates an integrated current value of the fuel cell stack 1 from IG-ON on the basis of a current signal from the current sensor 33 and a measurement signal from the timer 60, and the process proceeds to step S7.

In step S7, the temperature detecting unit 61 detects a temperature in the fuel cell stack 1, and the process proceeds to step S8.

In step S8, the warming up completion determining unit 46 determines whether the integrated current value detected by the integrated current value detecting unit 62 or the temperature in the fuel cell stack 1 detected by the temperature detecting unit 61 is equal to or higher than the warming up completion threshold.

If the determination result in step S8 is "YES" (if the integrated current value detected by the integrated current value detecting unit 62 or the temperature in the fuel cell stack 1 detected by the temperature detecting unit 61 is equal to or higher than the warming up completion threshold), it is determined that the ice in the fuel cell stack 1 has melted, and the process proceeds to step S9.

On the other hand, if the determination result in step S8 is "NO" (if the integrated current value detected by the integrated current value detecting unit 62 or the temperature in the fuel cell stack 1 detected by the temperature detecting unit 61 is lower than the warming up completion threshold), it is determined that the ice in the fuel cell stack 1 has not melted, and the process returns to step S5 to continue warming up.

Finally, in step S9 (if the determination result in step S8 is "YES"), the driver is informed that the ice in fuel cell stack 1 has melted and that warming up has been completed. Specifically, the warming up completion determining unit 46 outputs an informing signal to the informing unit 50, and the informing unit 50 turns off the warning lamp on the basis of the informing signal. Accordingly, the driver can recognize the completion of warming up of the fuel cell system 100.

As described above, in this embodiment, the thresholds set by the warming up completion threshold setting unit 43 are changed in accordance with a freezing state of generated water in the fuel cell stack 1.

With this configuration, in the case where the estimating unit 42 estimates that a low-temperature short-time operation was performed in the previous operation, the threshold changing unit 44 changes the warming up completion thresholds, whereby the informing unit 50 can accurately inform the driver that warming up has been completed. That is, in the case where a low-temperature short-time operation was performed in the previous operation or in low-temperature activation, the threshold changing unit 44 changes the warming up completion thresholds so that the time until when the informing unit 50 informs the driver of completion of warming up becomes long. Accordingly, completion of warming up can be determined after the generated water frozen in the fuel cell stack 1 has melted.

Accordingly, the driver can predict completion of warming up. Furthermore, the driver can be informed of completion of warming up after a desired power generation performance has been ensured through accurate determination of warming up completion even under a low-temperature environment, such as in winter or in a cold region. Accordingly, inconvenience for the driver, e.g., a desired performance is not obtained although the informing unit 50 has informed the driver of completion of warming up, does not occur, which enhances merchantability. Furthermore, the fuel cell system 100 according to this embodiment is not necessary to be provided with an additional member for determining completion of warming up, so that the manufacturing efficiency and manufacturing cost can be maintained.

In this case, by using a temperature as a warming up completion threshold, completion of warming up can be determined after the temperature in the fuel cell stack 1 has risen to the temperature that causes generated water frozen in the fuel cell stack 1 to be melted. Accordingly, the driver can be accurately informed of completion of warming up after a desired power generation performance of the fuel cell stack 1 has been ensured.

Furthermore, by using also an integrated current value as a warming up completion threshold, completion of warming up can be determined after a heat amount that causes generated water frozen in the fuel cell stack 1 to be melted has been obtained. Accordingly, determination of warming up completion can be performed more accurately.

Particularly, the fuel cell system 100 according to this embodiment has thresholds of both temperature and integrated current value as warming up completion thresholds and is thus capable of determining completion of warming up on the basis of an arbitrary threshold. In this case, determining completion of warming up is preferably performed on the basis of the integrated current value or both the integrated current value and temperature in ordinary warming up.

Determining completion of warming up can be performed under various warming up environments. For example, when the vehicle is running, a rise in temperature in the fuel cell stack 1 is not so significant due to an airflow induced by the running, and thus determination is preferably performed on the basis of the integrated current value. On the other hand, when the vehicle is parked in a garage or the like, the temperature in the fuel cell stack 1 is apt to rise, and thus determination is preferably performed on the basis of the temperature.

During low-temperature activation, an activity level of the catalyst is lower than that during normal-temperature activation, and it is possible that a desired power generation performance of the fuel cell stack 1 is not obtained. Also, during low-temperature activation, generated water generated just after start of activation freezes even if a low-temperature short-time operation was not performed in the previous operation, and a small amount of ice is likely to exist in the fuel cell stack 1 compared to activation after a low-temperature short-time operation.

On the other hand, in this embodiment, the warming up completion thresholds are changed to thresholds equivalent to the warming up completion thresholds in activation after a low-temperature short-time operation when it is detected that low-temperature activation is being performed in the present operation, and thus the activity level of the catalyst can be enhanced and the ice generated during low-temperature activation can be reliably melted when the integrated current value and temperature are equal to or higher than the thresholds. Accordingly, the power generation performance of the fuel cell stack 1 can be reliably ensured at completion of warming up. Melting of ice is determined on the basis of the integrated current value whereas the activity level of the catalyst is determined on the basis of the temperature, whereby a more accurate determination of warming up completion can be performed.

Preferably, an output capable of obtaining a predetermined power generation performance is actually set as the warming up completion threshold in order to determine completion of warming up, but it is necessary to detect an accurate output on the basis of the power generation performance of the fuel cell stack 1 at the time of detection in order to directly determine completion of warming up on the basis of the output. However, the output of the fuel cell stack 1 is unstable just after start of activation. An accurate output is not detected unless a stationary state continues for a predetermined period under a constant output. For this reason, it is determined in this embodiment whether an output for determining completion of warming up can be obtained on the basis of a temperature and an integrated current value.

In the first embodiment, descriptions have been given about the case where the warming up completion threshold is set on the basis of an integrated current value or a temperature. The present invention is not limited to this case, and the warming up completion threshold may be set on the basis of the time from IG-ON. Alternatively, the warming up completion threshold can be calculated on the basis of an integrated value of voltage and an integrated value of power of the fuel cell stack 1. In the present invention, the integrated values of current, voltage, and power are collectively referred to as an integrated amount of generated electric power. Alternatively, only any of the above-described integrated amount of generated electric power, temperature, and time may be set as a warming up completion threshold.

Second Embodiment

Hereinafter, a second embodiment of the present invention is described with reference to FIG. 7. FIG. 7 is a flowchart of a warming up completion determining method according to the second embodiment. The second embodiment is different from the first embodiment in that determination for changing an integrated current value as a warming up completion threshold and determination for changing a temperature as a warming up completion threshold are separately performed. In the following description, the same parts as those in the first embodiment are denoted by the same reference numerals or step numbers, and a corresponding description is omitted.

As illustrated in FIG. 7, upon IG-ON of the vehicle, the warning lamp of the informing unit 50, indicating that warming up has not yet been completed, is turned on in step S1, and the warming up completion threshold setting unit 43 sets the warming up completion thresholds to initial values in step S2.

In step S13, it is determined whether a low-temperature short-time operation was performed in the previous operation. Specifically, as in step S3 in the first embodiment, the estimating unit 42 determines whether the temperature and activation time of the fuel cell stack 1 in the previous operation are equal to or lower than the estimation thresholds, thereby determining whether a low-temperature short-time operation was performed in the previous operation so as to estimate the presence/absence of ice in the fuel cell stack 1.

If the determination result in step S13 is "YES" (if the temperature and activation time of the fuel cell stack 1 in the previous operation are equal to or lower than the estimation thresholds), the estimating unit 42 determines that a low-temperature short-time operation was performed in the previous operation and estimates that ice exists in the fuel cell stack 1, and the process proceeds to step S14. On the other hand, if the determination result in step S13 is "NO" (if the temperature and activation time of the fuel cell stack 1 in the previous operation exceed the thresholds), the estimating unit 42 determines that a low-temperature short-time operation was not performed in the previous operation, and the process proceeds to step S15.

In step S14 (if the determination result in step S13 is "YES"), the threshold changing unit 44 changes the warming up completion threshold of the integrated current value. Specifically, the threshold changing unit 44 changes the warming up completion threshold to a value higher than the initial integrated current value set by the warming up completion threshold setting unit 43, that is, to an integrated current value that can ensure a heat amount necessary to melt the ice generated in the low-temperature short-time operation. Subsequently, the process proceeds to step S16.

In step S15, it is determined whether low-temperature activation is being performed in the present operation. Specifically, as in step S3 in the first embodiment, the low-temperature activation detecting unit 45 detects whether the temperature in the fuel cell stack 1 in the present operation is equal to or lower than the low-temperature activation determination threshold.

If the determination result in step S15 is "YES" (if the temperature in the fuel cell stack 1 in the present operation is equal to or lower than the low-temperature activation determination threshold), the low-temperature activation detecting unit 45 determines that low-temperature activation is being performed in the present operation, and the process proceeds to step S16. On the other hand, if the determination result in step S15 is "NO" (if the temperature in the fuel cell stack 1 in the present operation exceeds the low-temperature activation determination threshold), the low-temperature activation detecting unit 45 determines that low-temperature activation is not being performed in the present operation, and the process proceeds to step S5.

In step S16, as in step S6 in the first embodiment, the threshold changing unit 44 changes the warming up completion threshold of the temperature in the fuel cell stack 1. Preferably, the warming up completion threshold of the temperature changed in step S15 is set to a temperature necessary to melt the ice existing in the fuel cell stack 1 due to a low-temperature short-time operation.

As described above, in this embodiment, if a low-temperature short-time operation was performed in the previous operation, the warming up completion thresholds of both the integrated current value and temperature are changed. On the other hand, if low-temperature activation is being performed in the present operation, only the warming up completion threshold of the temperature is changed.

Subsequently, the integrated current value detecting unit 62 detects the integrated current value of the fuel cell stack 1 in step S5, and the temperature detecting unit 61 detects the temperature in the fuel cell stack 1 in step S7, as in the first embodiment. After that, the process proceeds to step S8.

In step S8, it is determined whether the integrated current value detected by the integrated current value detecting unit 62 or the temperature in the fuel cell stack 1 detected by the temperature detecting unit 61 is equal to or higher than the warming up completion threshold.

If the determination result in step S8 is "YES" (if the integrated current value detected by the integrated current value detecting unit 62 or the temperature in the fuel cell stack 1 detected by the temperature detecting unit 61 is equal to or higher than the warming up completion threshold), it is determined that the ice in the fuel cell stack 1 has melted, and the process proceeds to step S9.

On the other hand, if the determination result in step S8 is "NO" (if the integrated current value detected by the integrated current value detecting unit 62 or the temperature in the fuel cell stack 1 detected by the temperature detecting unit 61 is lower than the warming up completion threshold), it is determined that the ice in the fuel cell stack 1 has not been melted, and the process returns to step S5, where warming up continues.

Finally, in step S9, the driver is informed that the ice in the fuel cell stack 1 has melted and that the warming up has been completed. Accordingly, the driver can recognize completion of warming up of the fuel cell system 100.

According to the above-described second embodiment, the same operation and effect as those in the first embodiment can be obtained. In addition, when a small amount of ice exists in the fuel cell stack 1 as in the low-temperature activation, only the warming up completion threshold of a temperature is changed while the warming up completion threshold of an integrated current value being maintained at the initial value. That is, when the amount of ice existing in the fuel cell stack 1 is small, the ice can reliably melted and the catalyst can be activated when the temperature is equal to or higher than the warming up completion threshold. As a result, completion of warming up can be easily determined and warming up can be quickly performed in low-temperature activation, which enhances merchantability.

The present invention is not limited to the above-described embodiments, and various changes of design can be accepted without deviating from the scope of the invention. For example, in the above-described embodiments, the fuel cell system is applied to a fuel cell vehicle, but the fuel cell system can be applied to apparatuses other than the fuel cell vehicle.

An embodiment of the present invention provides a fuel cell system capable of informing a driver that warming up has been completed after ensuring a desired power generation performance by accurately determining completion of warming up even in activation under a low-temperature environment or activation after a low-temperature short-time operation, and also provides a warming up completion determining method for the fuel cell system.

According to an embodiment of the present invention, there is provided a fuel cell system (e.g., a fuel cell system 100 in the embodiments) including a fuel cell stack (e.g., a fuel cell stack 1 in the embodiments) configured to generate electric power by being supplied with reactive gas, a warming up status detecting unit (e.g., a warming up status detecting unit 41 in the embodiments) configured to detect a warming up status of the fuel cell stack, a warming up completion threshold setting unit (e.g., a warming up completion threshold setting unit 43 in the embodiments) configured to set a threshold used to determine completion of warming up of the fuel cell stack, an informing unit (e.g., an informing unit 50 in the embodiments) configured to perform informing of completion of warming up when a value detected by the warming up status detecting unit is equal to or higher than the threshold set in advance by the warming up completion threshold setting unit, an estimating unit (e.g., an estimating unit 42 in the embodiments) configured to estimate whether generated water is frozen in the fuel cell stack, and a threshold changing unit (e.g., a threshold changing unit 44 in the embodiments)

configured to change the threshold set by the warming up completion threshold setting unit in accordance with a freezing state of the generated water in the fuel cell stack estimated by the estimating unit.

As described above, when generated water generated through generation of electric power of the fuel cell stack is frozen in the fuel cell stack, the power generation performance may be degraded compared to that in ordinary activation. On the other hand, according to the above-described configuration, the threshold changing unit changes the threshold for warming up completion when it is estimated that the generated water is frozen, whereby the informing unit can accurately inform a driver of completion of warming up. That is, by changing the threshold for warming up completion in accordance with activation under a low-temperature environment, such as in winter or in a cold region, completion of warming up can be determined after the generated water frozen in the fuel cell stack has melted. Accordingly, the driver can predict completion of warming up, and a desired power generation performance of the fuel cell stack can be ensured after warming up has been completed even in use under a low-temperature environment, such as in winter or in a cold region. Therefore, inconvenience for the driver, e.g., a desired performance is not obtained although the informing unit has informed the driver of completion of warming up, does not occur, which enhances merchantability.

The threshold set by the warming up completion threshold setting unit may include a threshold of a temperature in the fuel cell stack. The warming up status detecting unit may detect a temperature in the fuel cell stack.

With this configuration in which a temperature is used as a threshold for determining completion of warming up, completion of warming up can be determined after the temperature in the fuel cell stack has risen to the temperature for melting the generated water frozen in the fuel cell stack, so that the driver can be informed of completion of warming up after a desired power generation performance has been ensured.

The threshold set by the warming up completion threshold setting unit may include a threshold of an integrated amount of generated electric power in the fuel cell stack. The warming up status detecting unit may detect an integrated amount of generated electric power in the fuel cell stack.

With this configuration in which an integrated amount of generated electric power is used as a threshold for determining completion of warming up, completion of warming up can be determined after a heat amount for melting the generated water frozen in the fuel cell stack has been obtained, so that the driver can be informed of completion of warming up after a desired power generation performance has been ensured.

The estimating unit may estimate whether generated water is frozen in the fuel cell stack on the basis of whether a previous operation was performed under a low-temperature environment for a short time. When the estimating unit determines that the previous operation was performed under a low-temperature environment for a short time, the threshold changing unit may change the threshold to a first threshold so that a time until when the informing unit performs informing of completion of warming up becomes long.

With this configuration, in the case where a low-temperature short-time operation was performed in the previous operation, the threshold changing unit changes the threshold to the first threshold so that the time until the informing unit performs informing of completion of warming up becomes long. Accordingly, completion of warming up can be determined after generated water frozen in the fuel cell stack has melted. As a result, inconvenience for the driver, e.g., a desired performance is not obtained although the informing unit has informed the driver of completion of warming up, does not occur, which enhances merchantability.

In the case where the fuel cell stack is activated under a low-temperature environment, such as in winter or in a cold region (hereinafter referred to as low-temperature activation), an activity level of a catalyst is lower than that in normal-temperature operation, and it is possible that a desired power generation performance of the fuel cell stack is not obtained. Also, during the low-temperature activation, generated water generated just after start of activation freezes even if a low-temperature short-time operation was not performed in the previous operation. Accordingly, ice may exist in the fuel cell stack although the amount of the ice is smaller than that in the case of activation after a low-temperature short-time operation.

The fuel cell system may further include a low-temperature activation detecting unit (e.g., a low-temperature activation detecting unit 45 in the embodiments) configured to detect whether low-temperature activation is being performed in a present operation. The threshold changing unit may change the threshold to the first threshold when the low-temperature activation detecting unit detects that low-temperature activation is being performed in the present operation.

With this configuration, the threshold is changed to the first threshold for activation after a low-temperature short-time operation when it is detected that low-temperature activation is being performed in the present operation. A value equal to or higher than the first threshold enables the catalyst to be activated and the ice generated in low-temperature activation to be reliably melted.

According to another embodiment of the present invention, there is provided a warming up completion determining method for a fuel cell system including a fuel cell stack configured to generate electric power by being supplied with reactive gas, a warming up status detecting unit configured to detect a warming up status of the fuel cell stack, a warming up completion threshold setting unit configured to set a threshold used to determine completion of warming up of the fuel cell stack, and an informing unit configured to perform informing of completion of warming up when a value detected by the warming up status detecting unit is equal to or higher than the threshold set in advance by the warming up completion threshold setting unit. The warming up completion determining method includes estimating whether generated water is frozen in the fuel cell stack, and changing the threshold set by the warming up completion threshold setting unit in accordance with a freezing state of the generated water in the fuel cell stack estimated in the estimating.

With this method, the threshold for warming up completion is changed when it is estimated that the generated water is frozen, whereby the informing unit can accurately inform a driver of completion of warming up. That is, by changing the threshold for warming up completion in accordance with activation under a low-temperature environment, such as in winter or in a cold region, completion of warming up can be determined after the generated water frozen in the fuel cell stack has melted. Accordingly, the driver can predict completion of warming up, and a desired power generation performance of the fuel cell stack can be ensured after warming up has been completed even in use under a low-temperature environment, such as in winter or in a cold region. Therefore, inconvenience for the driver, e.g., a desired performance is not obtained although the informing unit has informed the driver of completion of warming up, does not occur, which enhances merchantability.

In the above-described embodiments, the warming up completion thresholds for activation after a low-temperature short-time operation are the same as those for low-temperature activation. However, the present invention is not limited to the embodiments, and the warming up completion thresholds can be set in accordance with various cases. In that case, the warming up completion thresholds for activation after a low-temperature short-time operation are preferably higher than the warming up completion thresholds for low-temperature activation.

Furthermore, the informing unit 50 is not limited to the lamp, but a configuration of outputting voices or a buzzer upon completion of warming up can be accepted.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A fuel cell system comprising:
   a fuel cell stack configured to generate electric power using reactive gas supplied to the fuel cell stack;
   a warming up status detector configured to detect a warming up status of the fuel cell stack and including an activation timer configured to measure an activation time during which the fuel cell system is in operation and a temperature detector configured to detect a temperature in the fuel cell stack;
   a memory configured to record the activation time measured by the activation timer in a previous operation of the fuel cell system as a previous activation time and configured to record the temperature detected by the temperature detector in the previous operation of the fuel cell system as a previous operation temperature;
   a warming up completion threshold setter configured to set an integrated current threshold value and a temperature threshold value in order to determine completion of warming up of the fuel cell stack;
   an informing device configured to inform of completion of warming up when an integrated current value corresponding to the warming up status detected by the warming up status detector is equal to or higher than the integrated current threshold value set by the warming up completion threshold setter and when a temperature value corresponding to the warming up status detected by the warming up status detector is equal to or higher than the temperature threshold value set by the warming up completion threshold setter;
   an estimator configured to estimate whether generated water is frozen in the fuel cell stack on a basis of the previous activation time and the previous operation temperature, the estimator estimating that the generated water is frozen in the fuel cell stack if the previous activation time is equal to or shorter than a first estimation threshold and if the previous operation temperature is equal to or lower than a second estimation threshold; and
   a threshold changer configured to change, if the estimator estimates that the generated water is frozen in the fuel cell stack, the integrated current threshold value and/or the temperature threshold value set by the warming up completion threshold setter to extend a time period until the informing device informs of the completion of warming up,
   wherein, when the estimator determines that a low-temperature short-time operation was performed in the previous operation, the threshold changer changes the integrated current threshold value and the temperature threshold value, and
   wherein, when the estimator determines that a low-temperature short-time operation was not performed in the previous operation and was performed in the present operation, the threshold changer changes only the temperature threshold value and maintains the integrated current threshold value.

2. The fuel cell system according to claim 1,
   wherein the threshold changer changes, if the estimator estimates that the generated water is frozen in the fuel cell stack, the temperature threshold value set by the warming up completion threshold setter from a predetermined temperature to the first threshold value higher than the predetermined temperature.

3. The fuel cell system according to claim 1,
   wherein the warming up status detector includes an integrated current value detector configured to detect the integrated amount of electric power generated in the fuel cell stack, and
   wherein the threshold changer changes, if the estimator estimates that the generated water is frozen in the fuel cell stack, the integrated current threshold value set by the warming up completion threshold setter from a predetermined integrated current value to a first threshold value higher than the predetermined integrated current value.

4. The fuel cell system according to claim 1,
   wherein the activation time is defined as a time from a timing at which an ignition is turned on to a timing at which the ignition is tuned off in a vehicle.

5. The fuel cell system according to claim 1, further comprising:
   a low-temperature activation detector configured to detect whether low-temperature activation is being performed in a present operation, the low-temperature activation detector detecting that the low-temperature activation is being performed in the present operation if the temperature detected by the temperature detector in the present operation is equal to or lower than a low-temperature activation determination threshold.

6. A warming up completion determining method for a fuel cell system comprising:
   supplying reactive gas to a fuel cell stack to generate electric power;
   detecting a warming up status of the fuel cell stack, the detecting of the warming up status including measuring an activation time during which the fuel cell system is in operation and detecting a temperature in the fuel cell stack;
   recording the activation time measured in a previous operation of the fuel cell system as a previous activation time and recording the temperature detected in the previous operation of the fuel cell system as a previous operation temperature;
   setting an integrated current threshold value and a temperature threshold value in order to determine completion of warming up of the fuel cell stack;
   informing of the completion of warming up when an integrated current value corresponding to the warming up status is equal to or higher than the integrated current threshold value and when a temperature value corresponding to the warming up status is equal to or higher than the temperature threshold value;
   estimating whether generated water is frozen in the fuel cell stack on a basis of the previous activation time and the previous operation temperature, the estimating of whether generated water is frozen in the fuel cell stack including estimating that the generated water is frozen in the fuel cell stack if the previous activation time is equal to or shorter than a first estimation threshold and if the previous operation temperature is equal to or lower than a second estimation threshold; and changing, if the estimator estimates that the generated water is frozen in the fuel cell stack, the integrated circuit threshold value and/or the temperature threshold value to extend a time period until the informing device informs of the completion of warming up, wherein, when it is determined that a low-temperature short-time operation was performed in the previous operation, the integrated current threshold value and the temperature threshold value are both changed, and wherein, when it is determined that a low-temperature short-time operation was not performed in the previous operation and was performed in the present operation, only the temperature threshold value is changed and the integrated current threshold value is maintained.

7. The warming up completion determining method for a fuel cell system according to claim 6,
wherein the detecting of the warming up status includes detecting an integrated amount of electric power generated in the fuel cell stack, and
wherein, if it is estimated that the generated water is frozen in the fuel cell stack, the integrated current threshold value is changed from a predetermined integrated current value to a first threshold value higher than the predetermined integrated current value.

8. The warming up completion determining method for a fuel cell system according to claim 6,
wherein the activation time is defined as a time from a timing at which an ignition is turned on to a timing at which the ignition is tuned off in a vehicle.

9. The warming up completion determining method for a fuel cell system according to claim 6,
wherein, if it is estimated that the generated water is frozen in the fuel cell stack, the temperature threshold value is changed from a predetermined temperature to a second threshold value higher than the predetermined temperature.

10. The warming up completion determining method for a fuel cell system according to claim 6, further comprising:
detecting whether low-temperature activation is being performed in a present operation, the detecting of the low-temperature activation including detecting that the low-temperature activation is being performed in the present operation if the temperature detected in the present operation is equal to or lower than a low-temperature activation determination threshold.

11. A fuel cell system comprising:
supplying means for supplying reactive gas to a fuel cell stack to generate electric power;
warming up status detecting means for detecting a warming up status of the fuel cell stack, the warming up status detecting means including activation time measuring means for measuring an activation time during which the fuel cell system is in operation and temperature detecting means configured to detect a temperature in the fuel cell stack;
recording means for recording the activation time measured by the activation time measuring means in a previous operation of the fuel cell system as a previous activation time and for recording the temperature detected by the temperature detecting means in the previous operation of the fuel cell system as a previous operation temperature;
setting means for setting an integrated current threshold value and a temperature threshold value in order to determine completion of warming up of the fuel cell stack;
informing means for informing of the completion of warming up when an integrated current value corresponding to the warming up status is equal to or higher than the integrated current threshold value and when a temperature value corresponding to the warming up status detected is equal to or higher than the temperature threshold value;
estimating means for estimating whether generated water is frozen in the fuel cell stack on a basis of the previous activation time and the previous operation temperature, the estimating means being for estimating that the generated water is frozen in the fuel cell stack if the previous activation time is equal to or shorter than a first estimation threshold and if the previous operation temperature is equal to or lower than a second estimation threshold; and
changing means for changing, if the estimating means estimates that the generated water is frozen in the fuel cell stack, the integrated current threshold value and/or the temperature threshold value set by the setting means to extend a time period until the informing means informs of the completion of warming up,
wherein, when the estimating means determines that a low-temperature short-time operation was performed in the previous operation, the changing means changes the integrated current threshold value and the temperature threshold value, and
wherein, when the estimating means determines that a low-temperature short-time operation was not performed in the previous operation and was performed in the present operation, the changing means changes only the temperature threshold value and maintains the integrated current threshold value.

12. The fuel cell system according to claim 11,
wherein the changing means changes, if the estimating means estimates that the generated water is frozen in the fuel cell stack, the temperature threshold value set by the setting means from a predetermined temperature to a first threshold value higher than the predetermined temperature.

13. The fuel cell system according to claim 11,
wherein the warming up status detecting means includes integrated current value detecting means for detecting the integrated amount of electric power generated in the fuel cell stack, and
wherein the changing means changes, if the estimating means estimates that the generated water is frozen in the fuel cell stack, the integrated current threshold value set by the setting means from a predetermined integrated current value to a first threshold value higher than the predetermined integrated current value.

14. The fuel cell system according to claim 11,
wherein the activation time is defined as a time from a timing at which an ignition is turned on to a timing at which the ignition is tuned off in a vehicle.

15. The fuel cell system according to claim 11, further comprising:
low-temperature activation detecting means for detecting whether low-temperature activation is being performed in a present operation, the low-temperature activation detecting means being for detecting that the low-temperature activation is being performed in the present operation if the temperature detected by the temperature detecting means in the present operation is equal to or lower than a low-temperature activation determination threshold.

16. A fuel cell system comprising:

a fuel cell stack configured to generate electric power using reactive gas supplied to the fuel cell stack;

a warming up status detector configured to detect a warming up status of the fuel cell stack and including an activation timer configured to measure an activation time during which the fuel cell system is in operation and a temperature detector configured to detect a temperature in the fuel cell stack;

a memory configured to record the activation time measured by the activation timer in a previous operation of the fuel cell system as a previous activation time and configured to record the temperature detected by the temperature detector in the previous operation of the fuel cell system as a previous operation temperature;

a warming up completion threshold setter configured to set an integrated current threshold value and a temperature threshold value in order to determine completion of warming up of the fuel cell stack;

an informing device configured to inform of completion of warming up when an integrated current value corresponding to the warming up status detected by the warming up status detector is equal to or higher than the integrated current threshold value set by the warming up completion threshold setter and when a temperature value corresponding to the warming up status detected by the warming up status detector is equal to or higher than the temperature threshold value set by the warming up completion threshold setter; and a threshold changer configured to change, if the previous activation time is equal to or shorter than a first estimation threshold and if the previous operation temperature is equal to or lower than a second estimation threshold, the integrated current threshold value and/or the temperature threshold value set by the warming up completion threshold setter to extend a time period until the informing device informs of the completion of warming up, wherein, when it is determined that a low-temperature short-time operation was performed in the previous operation, the threshold changer changes the integrated current threshold value and the temperature threshold value, and wherein, when it is determined that a low-temperature short-time operation was not performed in the previous operation and was performed in the present operation, the threshold changer changes only the temperature threshold value and maintains the integrated current threshold value.

* * * * *